United States Patent
Galina et al.

(10) Patent No.: US 9,114,329 B2
(45) Date of Patent: Aug. 25, 2015

(54) SEMI-CONTINUOUS DEODORISER COMPRISING A STRUCTURED PACKING

(75) Inventors: Florivaldo Galina, Sao Paulo (BR); Lucas Klettenhofer, Sao Paul (BR); William Younggreen, Fredriksberg (DK); Steen Balchen, Fredriksberg (DK); Preben Rasmussen, Helsinge (DK)

(73) Assignee: Alfa Laval Corporate AB, Lund (SE)

( * ) Notice: Subject to any disclaimer, the term of this patent is extended or adjusted under 35 U.S.C. 154(b) by 489 days.

(21) Appl. No.: 13/389,339

(22) PCT Filed: Jul. 15, 2010

(86) PCT No.: PCT/SE2010/050845
§ 371 (c)(1),
(2), (4) Date: May 22, 2012

(87) PCT Pub. No.: WO2011/019315
PCT Pub. Date: Feb. 17, 2011

(65) Prior Publication Data
US 2012/0245372 A1  Sep. 27, 2012

(30) Foreign Application Priority Data
Aug. 12, 2009 (SE) ...................................... 0950585

(51) Int. Cl.
*B01J 8/04* (2006.01)
*B01D 3/34* (2006.01)
*B01D 3/28* (2006.01)
*B01D 3/38* (2006.01)
(Continued)

(52) U.S. Cl.
CPC *B01D 3/346* (2013.01); *B01D 3/28* (2013.01); *B01D 3/38* (2013.01); *C11B 3/14* (2013.01); *B01D 3/008* (2013.01)

(58) Field of Classification Search
None
See application file for complete search history.

(56) References Cited

U.S. PATENT DOCUMENTS

| 1,988,648 | A | * | 1/1935 | Engelke | .......................... 208/275 |
| 2,804,427 | A | * | 8/1957 | Suriano | ............................ 203/92 |

(Continued)

FOREIGN PATENT DOCUMENTS

| EP | 1505145 A1 | 2/2005 |
| GB | 2283435 A | 5/1995 |

(Continued)

OTHER PUBLICATIONS

International Search Report for PCT/SE10/050845, Feb. 17, 2011.

*Primary Examiner* — Yate K Cutliff
(74) *Attorney, Agent, or Firm* — MKG, LLC

(57) ABSTRACT

The present invention relates to a semi-continuous deodorizer comprising at least one stripping section, which stripping section comprises a feed buffer tray for liquids, a liquid flow regulating means, a liquid distributor, a structured packing, and a receiver tray, wherein the regulating means are regulating the liquid flow from the feed buffer tray to the distributor to distribute the flow of liquid over the structured packing. The liquid is in the packing contacted in counter-current flow to an already once-used stripping agent which is recovered from one of more of the trays installed in the apparatus. The invention relates further to a method for refining fats and oils in a semi-continuous deodorizer, a method for re-using stripping agent in a semi-continuous deodorizer, segregating the recovered distillate into high purity types matching the feed type, and a use of the semi-continuous deodorizer.

11 Claims, 4 Drawing Sheets

(51) Int. Cl.
*C11B 3/14* (2006.01)
*B01D 3/00* (2006.01)

(56) References Cited

U.S. PATENT DOCUMENTS

| | | | | |
|---|---|---|---|---|
| 3,310,487 | A | * | 3/1967 | Johnson et al. ............... 208/355 |
| 4,089,880 | A | * | 5/1978 | Sullivan ........................ 554/176 |
| 4,601,790 | A | * | 7/1986 | Stage ................................ 203/6 |
| 4,842,778 | A | | 6/1989 | Chen et al. |
| 4,996,072 | A | * | 2/1991 | Marschner et al. ........... 426/417 |
| 5,262,094 | A | | 11/1993 | Chuang |
| 5,437,714 | A | * | 8/1995 | Cook et al. ...................... 96/201 |
| 5,486,318 | A | * | 1/1996 | McKeigue et al. ........ 261/112.2 |
| 6,001,220 | A | * | 12/1999 | Hillstrom et al. ............. 202/153 |
| 6,172,248 | B1 | * | 1/2001 | Copeland et al. ............. 554/190 |
| 6,206,349 | B1 | | 3/2001 | Parten |
| 6,502,806 | B2 | * | 1/2003 | Richardson ...................... 261/97 |
| 6,672,572 | B2 | | 1/2004 | Werlen |
| 7,597,783 | B2 | * | 10/2009 | Kruidenberg ................. 202/186 |
| 7,892,335 | B2 | * | 2/2011 | Kellens et al. .................. 96/234 |
| 2005/0066823 | A1 | | 3/2005 | Kellens et al. |
| 2006/0124431 | A1 | | 6/2006 | Xie |
| 2008/0051599 | A1 | * | 2/2008 | Adami et al. .................. 560/129 |
| 2008/0305003 | A1 | | 12/2008 | Gullov-Rasmussen |

FOREIGN PATENT DOCUMENTS

| | | |
|---|---|---|
| SU | 150007 | 11/1961 |
| SU | 513072 | 5/1976 |
| SU | 1388417 | 4/1988 |

* cited by examiner

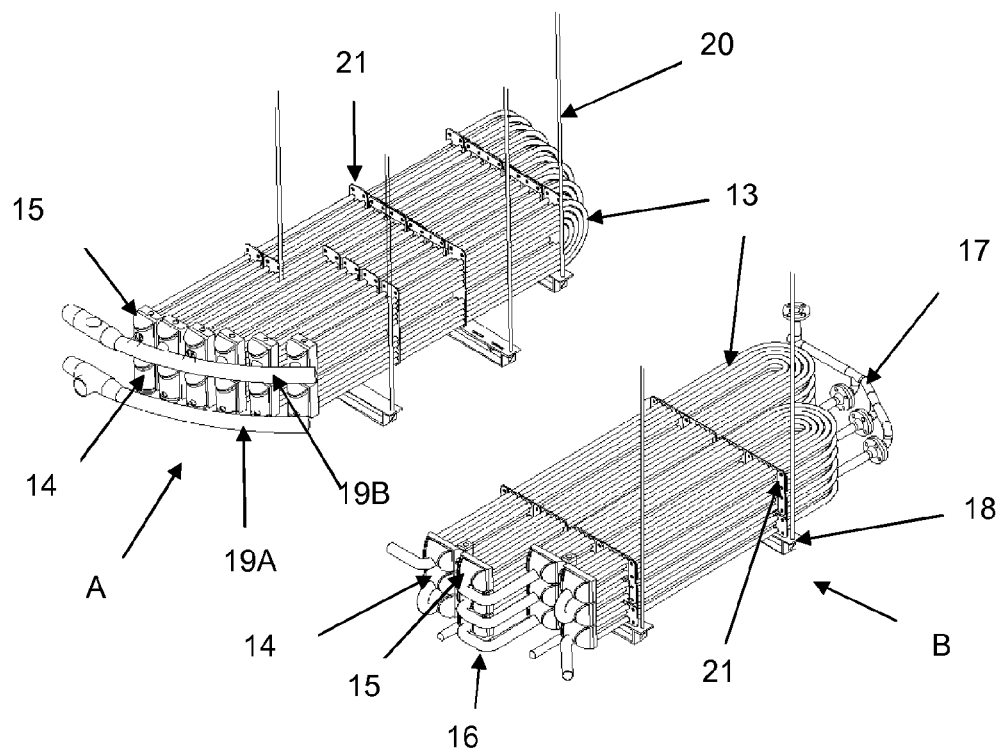
Figure 3 (A and B)
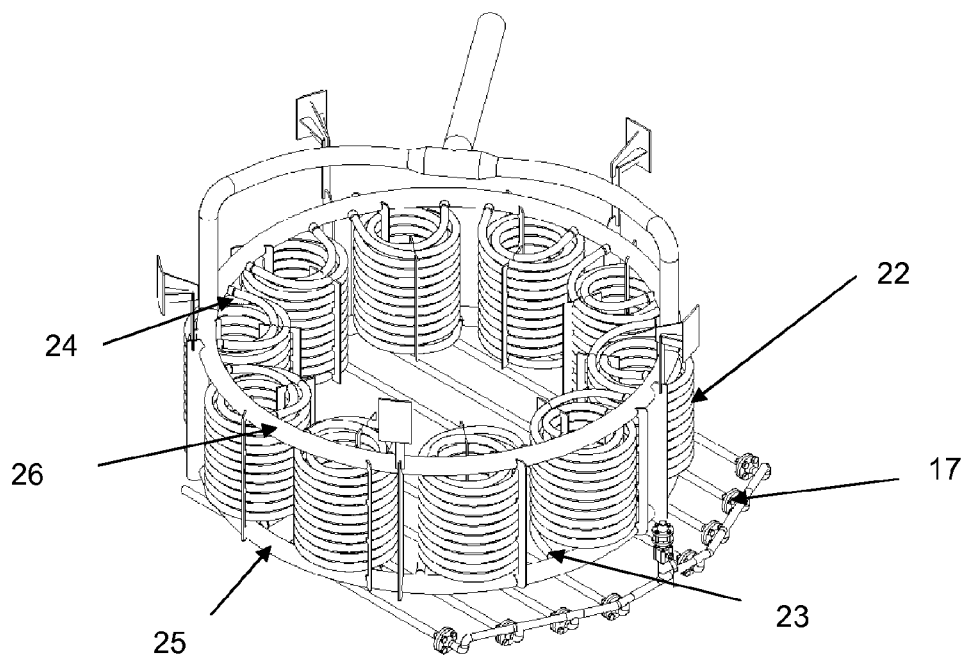
Figure 4

SEMI-CONTINUOUS DEODORISER COMPRISING A STRUCTURED PACKING

FIELD OF THE INVENTION

The present invention relates to a semi-continuous deodoriser, a method for refining fats and oils in a semi-continuous deodoriser, a method for re-using stripping gas or stripping steam in a semi-continuous deodoriser, and a use of the semi-continuous deodoriser.

BACKGROUND

The usual Semi-Continuous Deodoriser (SCD) is batch-operated, where oil batches are dumped from tray to tray in a tower construction having typically 8-11 trays. The main function of the deodoriser is taken place in 2 or 3 trays, where a stripping agent is brought into intimate contact with the oil by the use of Mammoth pumps or other gas-liquid contacting devices, thereby stripping off volatile components. The stripping agent is preferably steam, but can also be nitrogen, carbon dioxide or other inert gases, or combinations thereof.

The Mammoth pump is a further development of simpler contacting devices like a distribution pipe arrangement, i.e. straight pipe or ring shaped, for even distribution of the stripping agent in the oil phase by injection through a number of small holes/orifices. The function of the Mammoth pumps is that a stripping agent such as steam or vapour is injected in the bottom of the vertical or slightly angled pipes of the Mammoth pumps resulting in a Venturi-nozzle effect, thus transferring the oil from tray-bottom to above the liquid surface. The pump principle is also denominated a gas-lift pump.

The spray-effect and the liquid motion from a pressure related to the liquid height in the tray to the surface head space pressure enables the volatiles to be transferred into the gas phase and thus removed from the oil. The residence time provokes at the same time desired thermal decomposition of various components. To complete a certain stripping action, Mammoth pump operated trays require a long holding time compared to packed columns. If considering a typical physical refining task the required Mammoth tray holding time might be one hour, while a structured packing stripper can obtain same stripping efficacy in a few minutes.

The component types which are separated from the main product in deodorisation are often called "volatiles", referring to their vapour pressures being considerably higher than the triglyceride oil itself and thus prone to vaporise when subjecting the mixture to high temperature and vacuum. Typical volatiles are decomposition products of low molecular weight such as short chain alkanes or aldehydes, as well as Free Fatty Acids (FFA), of which the latter type is often used as marker for the goodness of the deodorisation efficacy.

Many continuous deodoriser designs on market to day have the stripping action enhanced by contacting the oil and steam in true counter-current mode while the oil formed a thin film on a structured packing. The counter-current contact reduces the stripping steam consumption which due to the application of vacuum constitutes a significant part of the total running costs.

However, the continuous deodoriser designs address the large scale bulk operators and are not suitable for discontinuous operations due to high batch-to-batch cross-contamination and loss of production time at product change.

There is a steady need for flexible deodorisers to process specialty and tailor-made mixtures and thus a need for deodorisers which can process smaller batches without significant cross-contamination or time delay.

The availability of better crude oil qualities enables refining by the so called physical refining route, which offers lower operating costs than the alternative refining by alkali-neutralisation but requires higher stripping efficacy.

Also the interests in limiting the formation of undesired by-products such as trans-fatty acids etc are calling for improved stripping efficacy in semi-continuous deodorisers, where the stripping action traditionally are provided by Mammoth pumps.

However, the required steam consumption to conduct a certain separation task is by nature governed by the flow contact, and the cross-flow contact obtained in Mammoth pumps can never compete with the counter-current thin film packing in respect to utilisation of the applied stripping agent.

SUMMARY

Accordingly the present invention addresses the above mentioned problems by providing a new semi-continuous deodoriser. Thus the present invention relates to a semi-continuous deodoriser comprising at least one stripping section, which stripping section comprises a feed buffer tray, liquid flow regulating means, a liquid distributor, a structured packing, and a receiver tray. The regulating means are regulating the liquid flow from the feed buffer tray to the distributor to distribute the liquid evenly over the cross-sectional area of the structured packing. By the use of a structured packing the stripping task is not anymore limiting the required holding time, and the applied holding time can thus be optimised for obtaining the desired product quality regarding the parameters related to the ongoing thermal reactions. The packing thus allows the refiner to apply or adjust the holding time which is required for the thermal reactions, and to provide higher degree of freedom to increase capacity, reduce undesired side-reactions such as formation of trans-fatty acids etc.

By incorporating a structured packing into the tray-based semi-continuous deodoriser according to the present invention will thus increase the stripping efficacy and enable physical refining at lower steam consumption and lower holding time than in semi-continuous deodorisers only equipped with Mammoth pumps.

The individual deodoriser could be designed according to the specific application properties. The amount of cross-contamination is correlated to the packing volume, and the actual packing size incorporated in the deodoriser could balance out the need of stripping to the acceptable cross-contamination level. There may be ways to reduce the cross-contamination and thus further improve the performance advantages, i.e. by blowing the structured packing with a gas, steam or vapour etc. The need of a buffer tank and a flow regulating mean is crucial to avoid flooding of the packing since the flow rate using for dumping the oil batch from tray to tray is much higher than the flow rate required inside the structured packing.

The semi-continuous deodoriser can also comprise combinations of mammoth pump operated trays and stripping sections, or the semi-continuous deodoriser could comprise more than one stripping section without having any Mammoth pump trays.

The heat transfer in the semi-continuous deodoriser could be performed by one or more heat exchanger systems. The design of the heat exchanger systems could be vertical bundles of U-tubes, horizontal bundles of U-tubes, spiral helix coils or other heat transfer design suitable for the actual operation.

The semi-continuous deodoriser according to the invention could comprise that at least one heat exchanger system is in the lower part of the semi-continuous deodoriser and at least one system is in the top part of the semi-continuous deodoriser, comprising at least one stripping section in between. The heat exchanger systems in the semi-continuous deodoriser could be connected to each other by pipes or ducts that heat accumulated in a heat transfer fluid collected from a cooling system is used for heating purpose in a heating system, and the thus cooled heat transfer fluid is re-cycled and re-heated in the same cooling system.

The semi-continuous deodoriser could also comprise that internal ducts or external ducts or combinations of internal ducts and external ducts are arranged for collecting the once-used flows of stripping agent from one or more trays or sections for re-using this gas in a stripper section.

The term internal duct is used for a duct which is connecting two adjacent trays without penetrating the deodoriser shell. The term external duct is characterised by penetrating the shell and is typically connected to a chimney which acts as common collector for all the trays. The pressure drop obtained in trays interconnected by internal ducts is "additive" as the trays with respect to the vapour side are coupled in series. The pressure drop obtained in trays interconnected by external ducts can be calculated by perceiving the trays being coupled in "parallel". The resulting pressure drop determines the head space pressure above the liquid in a certain tray and thus very important for the obtained stripping action.

The gas flow leaving a tray, where contact has been cross-flow, or leaving a stripper section located near the bottom of the deodoriser where oil purity is high, has only to a small extent been contaminated with volatiles and does thus still possess significant carrier capability.

The present invention relates also to a method for refining fats and oils suitable for, but not limited to, edible consumption. The method comprises feeding a liquid flow of fats or oils into a semi-continuous deodoriser, at some point in the processing scheme collecting the liquid in a feed buffer tray in a stripping section, regulating the flow of liquid from the feed buffer tray with regulating means, distributing the liquid over the cross-sectional area of a structured packing for enhanced surface contact with stripping agent in counter-current flow, collecting the liquid from the structured packing in a receiving tray before leaving the stripping section.

The typical application comprises contacting the liquid with stripping agent in cross flow during the heating phase before stripping is relevant, and further contacts with stripping agent after leaving the stripping section. The method could further comprise feeding the liquid from the stripping section into a second stripping section or feeding the liquid from the stripping section to one or more trays having mammoth pumps for further contact with the stripping gas or the stripping steam, or feeding the liquid from the stripping section to combinations of stripping sections and trays having mammoth pumps.

The present invention relates also to a method for re-using stripping agent in a semi-continuous deodoriser. The method comprises collecting once-used flows of stripping agent from one or more tray or stripping section and leading that flow through a feed duct to a section, contacting the collected flows of stripping agent with the flow of liquid in counter-current flow before discharging the second time-used flows of stripping agent.

The present invention relates also to a use of a semi-continuous deodoriser for refining edible fats and oils. Fats and oils in this invention are classified as, but not limited to, palm oil, palm kernel oil, coconut oil, tallow, lard, soybean oil, canola or rapeseed oil, cottonseed oil, corn or maize oil, sunflower oil, safflower oil, rice bran oil, olive oil, cocoa butter, sal fats, illipe butter, shea butter, milk butter, fish oils, groundnut oil, camelia oil, various types of exotic fats and oils, as well as oil-derivatives such as alkane esters, ethyl or methyl esters, etc.

The fatty matter content of the vapours can be recovered by condensation, typically in a scrubber device. As the distillate composition produced by this invention, in opposition to the distillate produced by present state of art deodorisers, in a certain time slot almost exclusively constitutes the volatiles from the oil batch at that time being processed in the stripper section, the distillate can be segregated into types related to the feed oil type. Segregation of fatty acid distillate of high purity is thus conducted by coordinating the drain of distillate loop and receiver switch-over to when a product change is occurring in the stripper section.

In the following will the invention be explained by the use of FIGS. 1 to 4. The figures are for the purpose of demonstrating the invention and are not intended to limit its scope.

BRIEF DESCRIPTION OF THE FIGURES

FIG. 3 is showing two sets of internals of a heat exchanger system according to the invention.

FIG. 4 is showing internals of a heat exchanger system in form of spiral coils.

DETAILED DESCRIPTION

Figure 1:
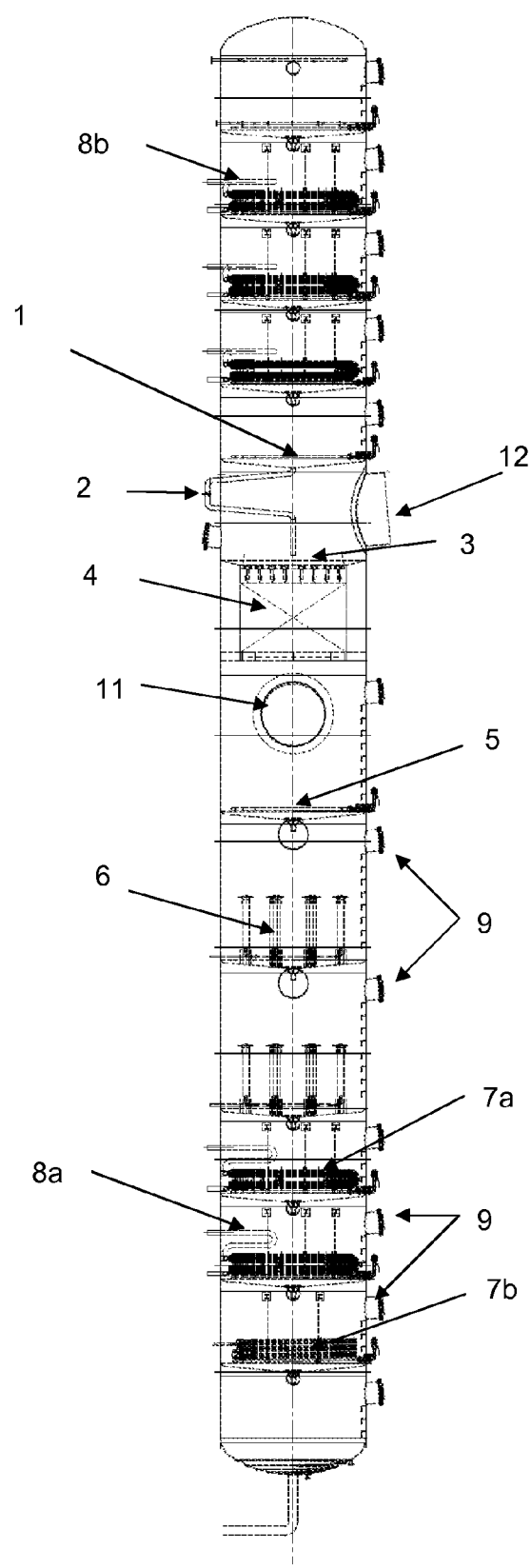
FIG. 1 is showing a semi-continuous deodoriser according to the invention without vacuum duct arrangement.

FIG. 1 is showing a semi-continuous deodoriser according to the invention. In this figure the deodoriser have one stripping section. The stripping section comprises a feed buffer tray 1 for flow of fluids, regulating means 2, a fluid distributer 3, structured packing 4, and a receiver tray 5. The liquid is collected in the buffer tray 1 from were it will, at controlled flow rate by the regulating mean 2, be fed to the distributor 3. The flow rate is adjusted to provide best possible balance between packing wetting and film thickness. The distributor 3 provides an even distribution over the cross-sectional area of the structured packing 4. The film provides enhanced contact between the liquid and the stripping agent, thus improving the mass transfer from liquid to gas phase. The contacted liquid is then collected in a receiver tray 5 from where it can be dumped to further trays for further processing.

FIG. 1 is also showing that the deodoriser can have Mammoth pump trays 6. The heat transfer in the deodoriser could be performed by any type of heat exchanger design. In this figure the heat transfer is provided by trays equipped with U-tube bundles 7a and 7b. The U-tube bundles are either vertical 7a or horizontal 7b according to the invention. The heat exchanger trays could be selected from trays having U-tube bundles or trays having spiral coils, not seen in the figure, or combinations of trays having U-tube bundles and trays having spiral coils, also not seen in the figure. Connected on top of the U-tube bundles are compensators 8a and 8b. The compensators 8a and 8b are either in vertical position 8a or in horizontal position. The position of the compensators depends on liquid level, space etc.

Figure 2:
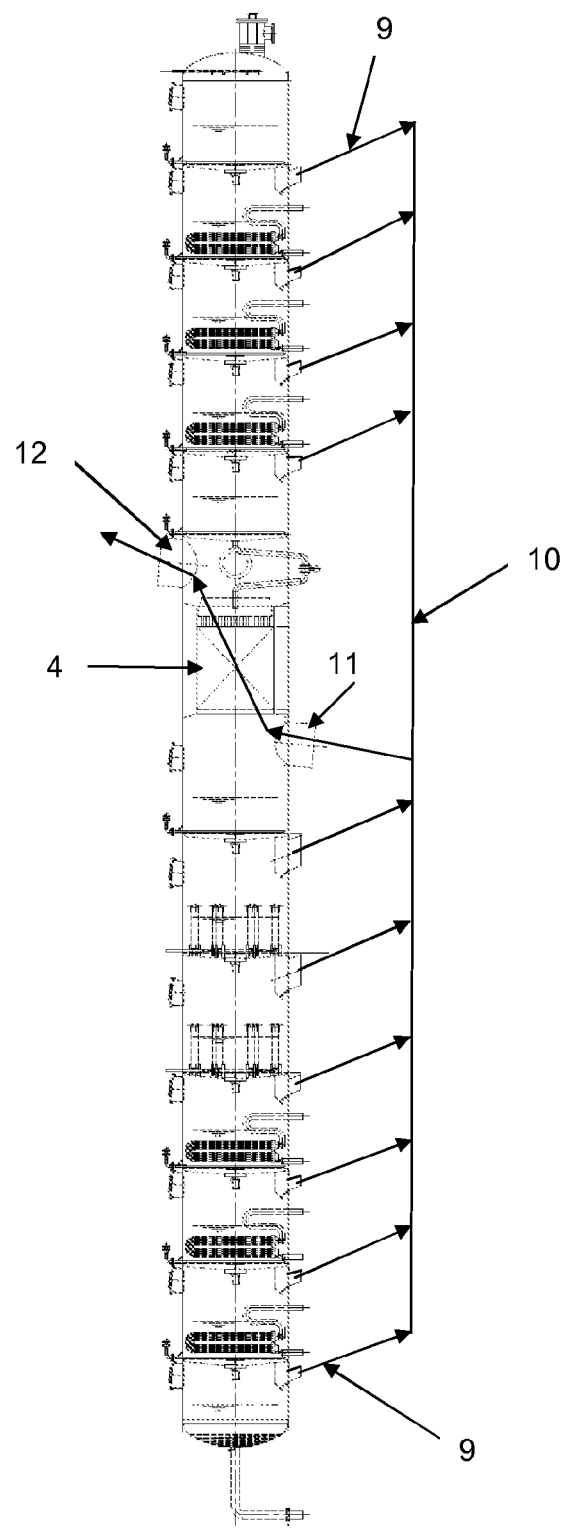
FIG. 2 is showing the collection and counter current reuse of once-used stripping agent.

FIG. 2 is showing how the once-used stripping agent can be collected and re-used in the structured packing 4. The used stripping agent leaving each tray via individual external ducts 9 and being collected in a central duct 10. From duct 10 the stripping agent flowing into structured packing 4 through duct 11 and contacted once more with the liquid flow, this time in counter current flow. The stripping flow is let out through duct 12.

FIGS. 3A and 3B shows two types of arrangements of U-tubes 13 and how the U-tubes are connected to each other in the two different arrangements. FIG. 3A is a vertical arrangement of the U-tubes which are connected parallel. FIG. 3B shows a horizontal arrangement of U-tubes. Two headers 14 and 15 are connected to U-tubes 13, one at the inlet and one at the outlet. The headers are connected in series in FIG. 3B, this means that an outlet header is connected to an inlet header via an external pipe 16, and the inlet header is connected to the inlet of the U-tubes, which U-tubes inter connects to an outlet header and so on.

FIG. 3B shows also that pipes 17 for stripping gas or for stripping steam could be arranged under U-tubes 13 and which pipes are guided through support devices 18. FIG. 3A shows how two manifolds 19A and 19B are connecting U-tubes parallel. The U-tubes are flexible arranged by support devices 18 and flexible means 20 such as rods, chains, wires, or combinations thereof. Between the support devices, the top support devices are not seen in these figures are the arranged that the U-tubes can move and expand with temperature. The U-tubes are also flexible guided through spacers 21 having holes.

FIG. 4 is showing an alternative arrangement of heat transfer means in a heat exchanger system. The internals in this figure are in form of spiral helix coils 22. The spiral coils, even packed as double spiral coils as seen in this figure, provides less installed heat transfer area per volume than the U-tubes. The individual spiral coils helixes are by the connections 23 and 24 connected in parallel to each other to the two headers 25 and 26. The flow direction depends on the application. FIG. 4 shows also that pipes 17 for stripping gas or for stripping steam could be arranged under the spiral coils. In larger heat exchanger tray diameters the spiral coils could be placed in two concentric rings inside the tray to provide a larger heat transfer area, this is not seen in FIG. 4.

Figure 5:
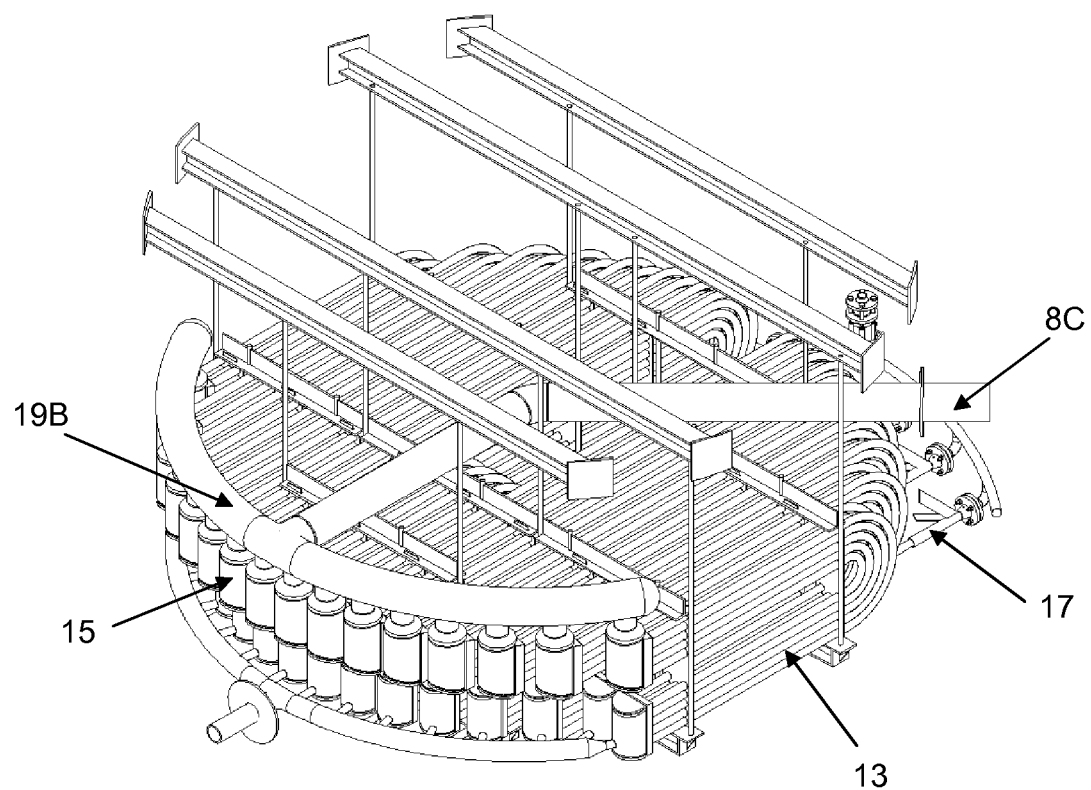
FIG. 5 is showing another embodiment according to the present invention wherein a compensator is mounted on top of vertical U-tubes.

FIG. 5 is showing another embodiment of the invention wherein a compensator 8C is mounted on top of vertical U-tubes 13, horizontal arranged U-tubes are also possible according to this embodiment but is not seen in this figure. According to this embodiment compensator 8C is connected to outlet manifold 19B, which is connected to outlet collector headers 15. Manifold 19B is according to this version placed above collector headers 15 and thus also above the vertical U-tubes 13. Compensator 8C is placed in same elevation as outlet manifold 19B, but compensator 8C is still bended for compensation of temperature differences etc. in pipe and tray liquid. Outlet collector headers 15 are connected to manifold 19B vertically according to this embodiment. FIG. 5 shows also that pipes 17 for stripping gas or for stripping steam could be arranged under U-tubes 13.

The invention claimed is:

1. A semi-continuous deodoriser comprising:
at least one stripping section; the stripping section comprising a feed buffer tray for collecting fats and/or oils, a liquid flow regulating means for regulating the flow of fats and/or oils from feed buffer tray, a liquid distributor for uniformly distributing the flow of fats and/or oils over a structured packing, the regulating means being configured to optimize a balance between wetting of the structured packing and a thickness of a film of the fats and/or oils on the structured packing, and a receiver tray for collecting the flow of fats and/or oils from the structured packing; and
a holding time regulator system defined by a cooperation of the feed buffer tray, the liquid flow regulating means and the structured packing.

2. The semi-continuous deodoriser according to claim 1, wherein the semi-continuous deodoriser further comprises one or more combinations of trays having mammoth pumps and stripping sections.

3. The semi-continuous deodoriser according to claim 1, wherein the semi-continuous deodoriser comprises two or more stripping sections.

4. The semi-continuous deodoriser according to claim 1, wherein the semi-continuous deodoriser also comprises one or more heat exchanger systems, and the heat exchanger system is selected from one or more systems from the group containing vertical bundles of U-tubes, horizontal bundles of U-tubes, spiral helix coils, circular heat transfer tubes or other heat transfer design suitable for the actual operation.

5. The semi-continuous deodoriser according to claim 4, wherein at least one heat exchanger system is in the lower part of the semi-continuous deodoriser and at least one system is in the top part of the semi-continuous deodoriser and that the systems are connected to each other by pipes or ducts for re-cycled heat transfer fluids.

6. The semi-continuous deodoriser according to claim 1, wherein the semi-continuous deodoriser also comprises one or more internal ducts or one or more external ducts or combinations of internal ducts and external ducts for stripping agent and volatiles.

7. The semi-continuous deodoriser according to claim 6, wherein ducts are arranged for collecting the flows of stripping agent from one of more trays and connected to a gas inlet of the stripping sections for re-using the stripping agent in counter current flow mode.

8. A method for enabling increased contact between stripping agent and product in a semi-continuous deodorizer, the method comprising:
providing a semi-continuous deodorizer comprising at least one stripping section, the stripping section comprising a feed buffer tray, a liquid flow regulating means in communication with the feed buffer tray, a liquid distributor in communication with a structured packing, and a receiver tray in communication with the structured packing;
providing at least one duct in communication with the semi-continuous deodorizer;
uniformly distributing, with the liquid distributor, the flow of fats and/or oils over the structured packing;
optimizing, with the regulating means, a balance between wetting of the structured packing and a thickness of a film of the fats and/or oils on the structured packing to enhance contact between a stripping agent and the fats and/or oils;
optimizing a holding time of the fats and/or oils on the structured packing, via cooperation of the feed buffer tray, the liquid flow regulating means and the structured packing;
collecting flows of the stripping agent from one or more tray or section of the semi-continuous deodorizer via the at least one duct,
leading collected once-used flows of the stripping agent through a feed duct to one or more stripping sections; and contacting the collected once-used flows of the stripping agent with a flow of the fats and/or oils in counter current flow before discharging the used flows of stripping agent for further processing.

9. The method according to claim 8, wherein the method further comprises
   i) collecting fats and/or oils in feed buffer tray in one or more stripping sections,
   ii) regulating the flow of fats and/or oils from feed buffer tray with regulating means, and
   iii collecting the flow of fats and/or oils from structured packing in a receiving tray before leaving the stripping section for further processing including contacts with stripping agent, which is preferably collected and re-used in the stripping section.

10. The method according to claim 8, wherein the method further comprises the flow of fats and/or oils from one or more stripping sections into a second stripping section or feeding the flow of fats and/or oils from the stripping section to one or more trays having mammoth pumps or other contacting devices installed for further contact with the stripping gas or the stripping steam, or feeding the flow of fats and/or oils from the stripping section to combinations of stripping sections and trays having mammoth pumps or other contacting devices.

11. The method according to claim 8, wherein the method further comprises conducting segregation of fatty acid distillate of high purity by coordinating the drain of distillate loop and receiver switch-over when a product change is occurring in the stripper section.

* * * * *